(12) United States Patent
de la Serna

(10) Patent No.: US 8,732,748 B2
(45) Date of Patent: May 20, 2014

(54) DYNAMICALLY CONFIGURABLE VIDEO INPUT LIST FOR TV

(75) Inventor: Guillermo Castano de la Serna, Tijuana, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1021 days.

(21) Appl. No.: 11/936,307

(22) Filed: Nov. 7, 2007

(65) Prior Publication Data

US 2009/0119705 A1 May 7, 2009

(51) Int. Cl.
*H04N 5/445* (2011.01)
(52) U.S. Cl.
CPC .................................. *H04N 5/44543* (2013.01)
USPC ............................................ 725/38; 715/811
(58) Field of Classification Search
CPC .................................................. H04N 5/44543
USPC ......................................... 725/37–61; 715/811
See application file for complete search history.

(56) References Cited

U.S. PATENT DOCUMENTS

| 6,182,287 | B1 * | 1/2001 | Schneidewend et al. ........ 725/48 |
| 7,603,685 | B2 * | 10/2009 | Knudson et al. ................. 725/46 |
| 7,757,250 | B1 * | 7/2010 | Horvitz et al. ................... 725/35 |
| 2007/0174043 | A1 * | 7/2007 | Makela ............................ 704/4 |
| 2008/0115186 | A1 * | 5/2008 | Cho ................................ 725/131 |

OTHER PUBLICATIONS

HDMI Specification Version 1.3a. Nov. 10, 2006. http://www.hdmi.org/download/HDMISpecification13a.pdf.*

* cited by examiner

*Primary Examiner* — Bennett Ingvoldstad
(74) *Attorney, Agent, or Firm* — Sony Corporation

(57) ABSTRACT

A video input list is presented on a TV with the viewer's most recent or most selected source moved at or near the top of the list. Also, specific and thus informative labels such as "DVD player" and "PVR" can be used in place of generic "HDMI 1", "video 2", etc. labels.

14 Claims, 5 Drawing Sheets

DYNAMICALLY CONFIGURABLE VIDEO INPUT LIST FOR TV

FIELD OF THE INVENTION

The present invention relates generally to dynamically configurable video input lists that are displayed on a TV.

BACKGROUND OF THE INVENTION

As TVs become increasingly sophisticated they can accept an increasing number of video inputs. For example, a TV can accept a video input from a disk player, a personal video recorder (PVR), etc., in addition to the conventional TV tuner.

To enable a viewer to select a source, TVs typically provide a list of video inputs. As understood herein, the video input list is static, so that, in the event that a viewer's most-used source is near the bottom of the list, the viewer must nonetheless scroll down through the list every time he desires to select that source.

Furthermore, the order of the video inputs on the list more or less reflects the history of the video inputs that have been provided, meaning that older video input sources are higher on the list than newer (and typically more desired) sources. Thus, to select a high end video input from the list, a viewer must scroll through the low end video input entries.

SUMMARY OF THE INVENTION

A TV system includes a TV display, a processor, and a tangible computer medium accessible by the processor and storing instructions executable by the processor to present an ordered list of video inputs on the display. The video inputs are dynamically ordered in the list in response to at least one user selection of a video input on the list.

The list may be ordered with more frequently selected video inputs nearer the front of the list than less frequently selected video inputs. In addition or alternatively the list can be ordered with more recently selected video inputs nearer the front of the list than less recently selected video inputs. A TV tuner input can, if desired, always be the first entry of the list, with remaining video inputs being ordered after the first entry in response to user selections. Further, if desired generic video source labels in the list may be automatically replaced with specific video source labels.

In another aspect, a method includes presenting a list of video inputs on a TV display, receiving at least one selection of a video input on the list, and in response to the selection, changing an order of video inputs on the list.

In still another aspect, a system includes a video monitor, a TV tuner, and a computer readable medium containing a list of video inputs including an entry to enable selection of the TV tuner as a desired source of video to be displayed on the monitor. The system also includes means for dynamically establishing an order of video inputs on the list in response to selections of video inputs from the list.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

As set forth further below, the video input list of a TV is ordered to follow the preferences of the viewer. The list can be ordered by latest video input selections and/or by most frequent video input selections, and if desired the TV tuner input selection can always remain at the top of the list. In this way, an automatically and dynamically sorted list of the most frequently used video inputs is generated to minimize key strokes, resulting, in combination with the use of video labels, an attractive and simple list that is easy and intuitive to navigate.

Figure 1:
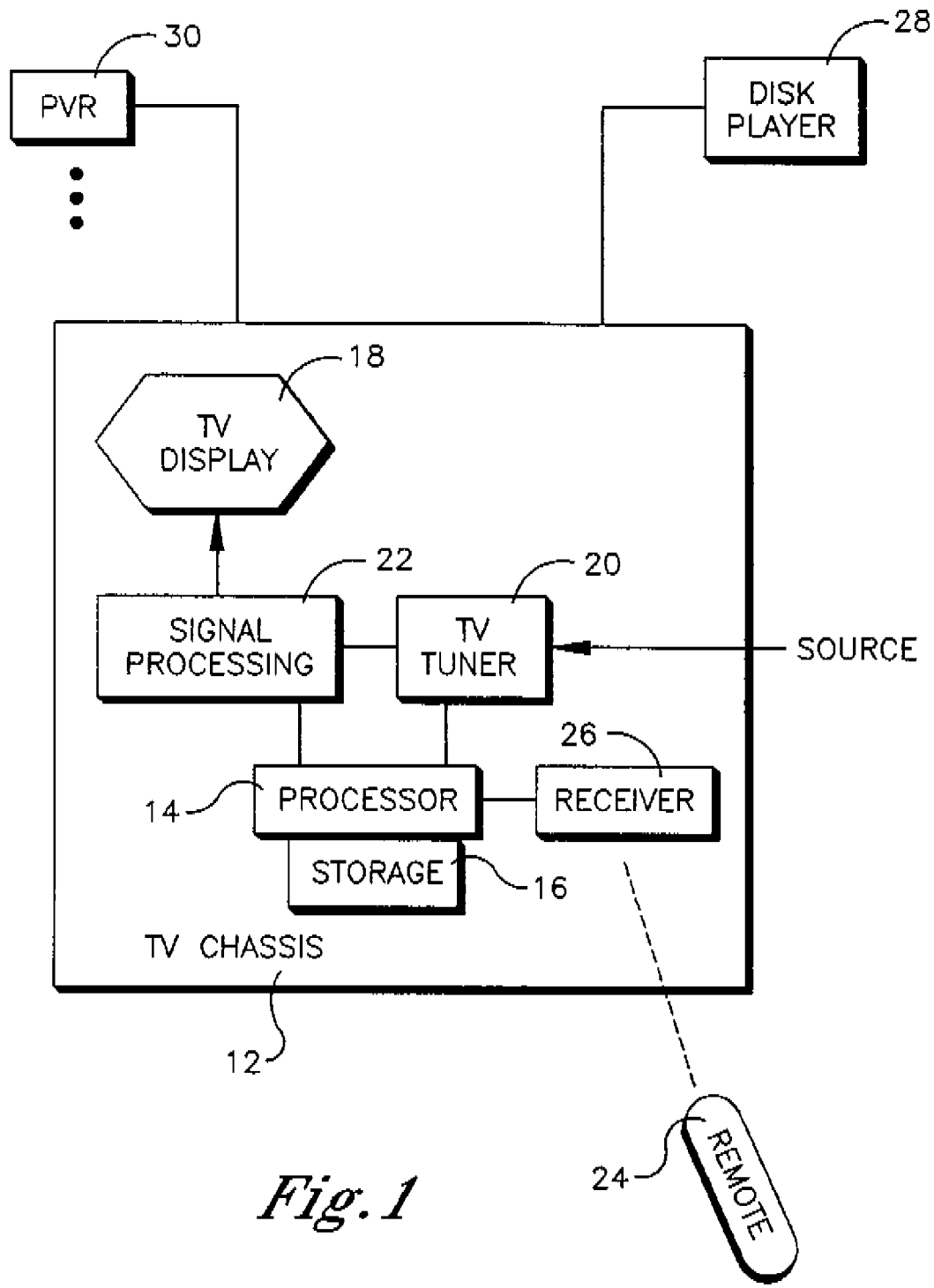
FIG. 1 is a block diagram of a non-limiting system according to present principles.

Referring initially to FIG. 1, a TV system is shown, generally designated 10, which includes a TV chassis 12 holding a processor 14 and tangible computer readable medium 16. The medium 16 can be solid state data storage, disk-based data storage, or other appropriate tangible medium including, e.g., tape storage, etc. that can contain code executable by the processor 14 for undertaking the present invention. The medium 16 can also store an order list of video inputs that the processor 14 can cause to be displayed on a TV monitor or display 18. The monitor or display 18 may be a standard definition or high definition display, and may be a cathode ray tube or flat panel matrix display or other appropriate TV display or monitor. It is to be understood that while FIG. 1 shows that the processor 14 resides in the TV chassis 12, in other implementations the processor 14 may reside in, e.g., a set-top box or set-back box.

As shown, a source of TV signals can input TV video and audio to a TV tuner 20 which may be controlled by the processor 14 to display a selected channel on the display 18. Signal processing circuitry 22 such as, e.g., demodulators, demultiplexers, and conditional access decryption circuitry may be interposed between the tuner 20 and display 18 in accordance with principles known in the art. Like the processor 14, the tuner 20 and/or signal processing circuitry 22 may be housed externally to the chassis 12 if desired.

The channel to be displayed, along with various other display features, typically is in response to a viewer command signal that might be generated by a wireless remote control 24 and detected by a complementary receiver 26, which communicates the commands to the processor 14. Among other things, the commands can include selection of which one of plural video inputs are desired to drive the display 18. One such input is the TV tuner 20; other non-limiting video inputs may be a disk player 28 such as a Blu-Ray or DVD player which communicates with the TV using high definition multimedia interface (HDMI) protocol, and a personal video recorder (PVR) 30. It is to be appreciated that many such video inputs can be provided and listed on the below-discussed list.

Figure 2:
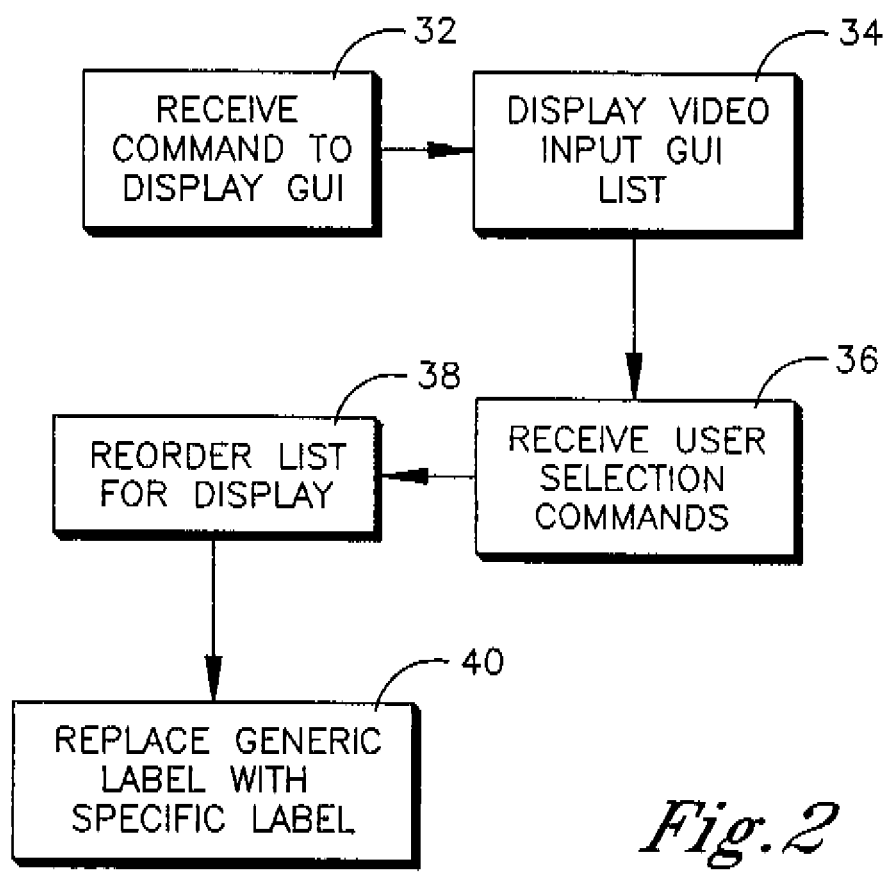
FIG. 2 is a flow chart of a non-limiting implementation of the present logic.
Figure 3:
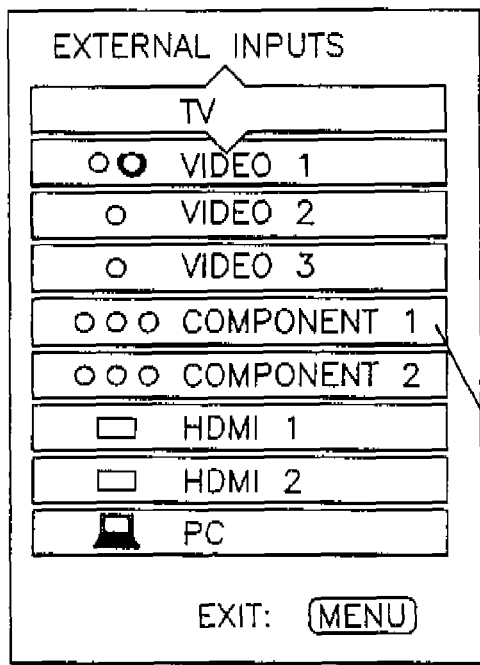
FIGS. 3-6 are non-limiting screen shots illustrating how the video input list can be dynamically ordered in accordance with the logic of FIG. 2.

Now referring to FIG. 2 for an overall understanding of how the processor 14 dynamically orders entries on a video input list, at block 22 a command from, e.g., the remote control 24 is received to display the video input selection GUI list. Initially the list might appear as shown in FIG. 3, listing all external video inputs available and with no specific labels attached. Thus, for example, the list shown in FIG. 3 has as its first entry "TV", meaning input from the TV tuner 20, followed by video input entries that are generically labeled "video 1" . . . "component 1", . . . "HDMI 1", . . . "PC" (for selecting as input a personal computer or Internet modem).

At block 36 user selections of entries on the list are received from, e.g., the remote control 24. In some embodiments, for each selection a counter is incremented for the selected video input. At block 38 the list is dynamically reordered automatically by the processor 14 based on the command received at block 36.

Figure 4:
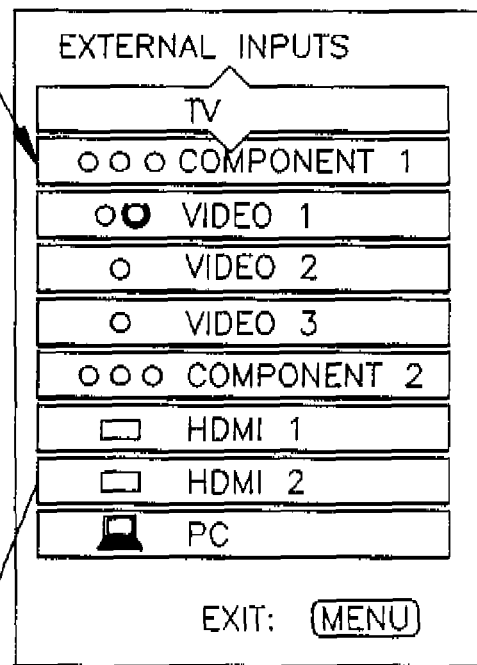

As an example and referring to FIGS. 3 and 4, assume that "component 1" has been selected from the list in FIG. 3. As indicated in FIG. 4, this entry ("component 1") is moved closer to the front (in this case, top) of the list. Next, assume that "HDMI 2" is selected from the list in FIG. 4. As shown by the arrow between FIGS. 4 and 5, "HDMI 2" as a consequence is moved closer to the front of the list.

In some implementations, the video input entries on the list are ordered based on recency of selection, i.e., the most recently selected video input is placed higher on the list than the second most recently selected input, and so on. In other implementations, the most frequently selected video input as indicated by the above-discussed counters is placed nearest the front of the list, i.e., the list is ordered by frequency of selection. It will readily be appreciated that in this latter case, the list might not be reordered every time an entry is selected.

The two methods can be combined, e.g., if two video inputs have been selected the same number of times, the most recently selected input can be placed just ahead of the other input having the same frequency of selection. Other ordering heuristics may be used, e.g., selections at certain times of day might be given higher priority and thus displayed higher on the list than other entries. For instance, if a particular video input is selected in the evening, implying adult selection, that input might be placed higher on the list than entries selected on Saturday mornings, implying child selections. Regardless, the TV input as shown may be maintained at the top of the list regardless of frequency or recency of selection, as shown in FIGS. 3-6, with remaining video inputs being ordered after the first (TV) entry in response to the user selections.

Figure 5:
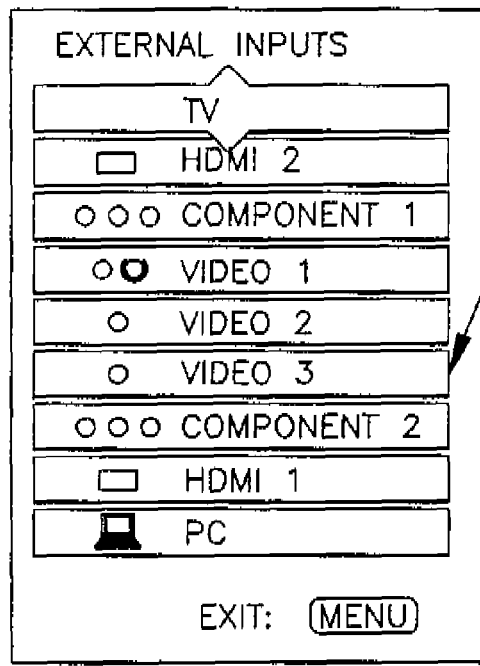
Figure 6:
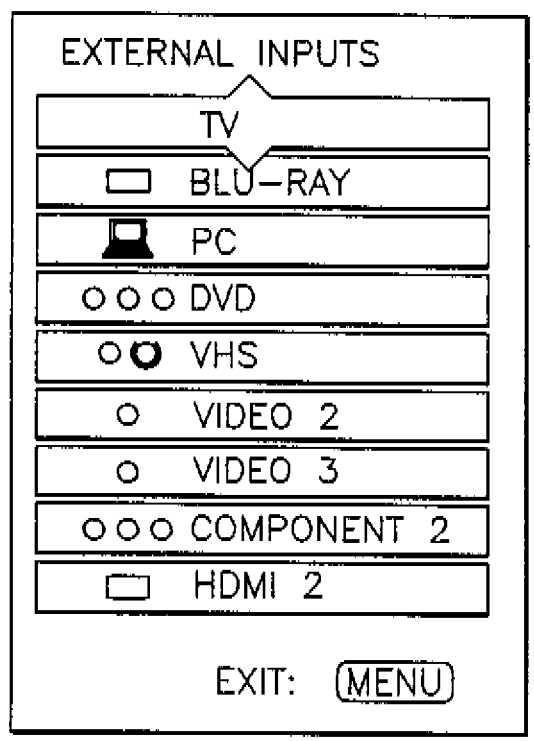

Block 40 in FIG. 2 indicates that generic labels of video inputs on the list may be replaced with specific labels. This is illustrated by comparing FIGS. 5 and 6. In FIG. 5, "HDMI 2" is listed just below the top (TV) entry, meaning it is, e.g., either the most frequently or most recently selected entry on the list. The processor 14, having communicated with the source associated with "HDMI 2" and learning it is a Blu-Ray disk player, has replaced the generic label "HDMI 2" of FIG. 5 with the more specific "Blu-Ray" label shown in FIG. 6. FIG. 6 has also reordered the list to move "PC" up from the original bottom position to just below "Blu-Ray", followed by the specific label "DVD" and a specific label ("VHS") for the former generic "video 1" label.

Figure 8:
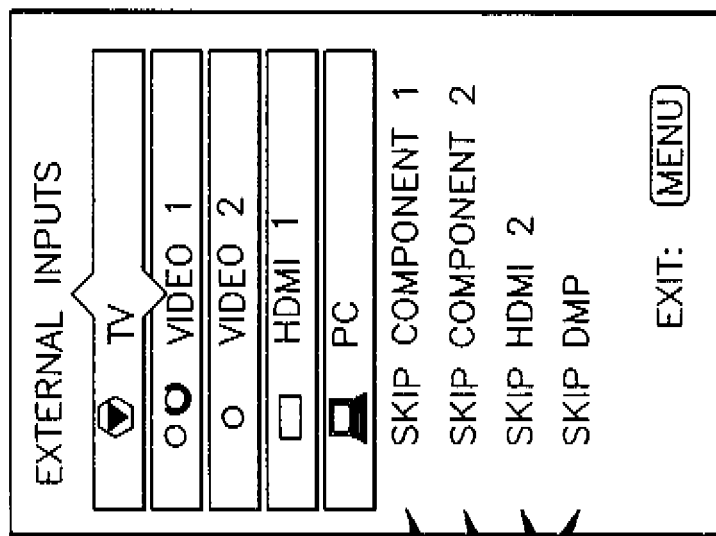
FIGS. 7 and 8 show how the video input list is reordered in response to a user disabling an input.
Figure 7:
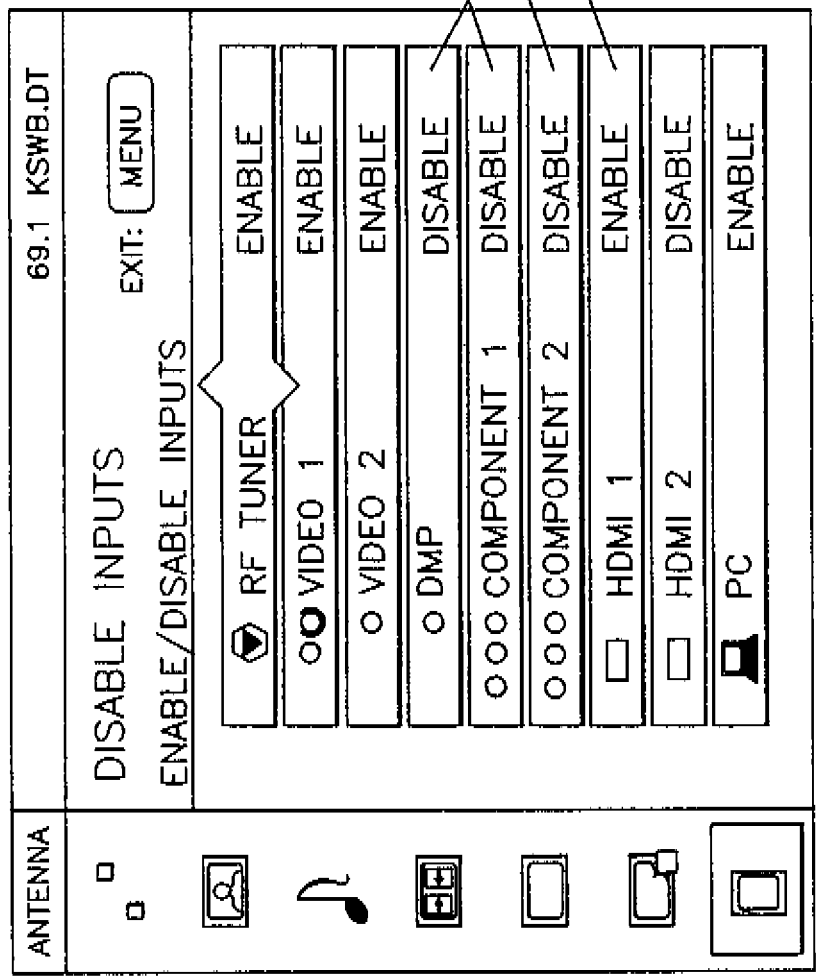

FIG. 7 shows a "disable input" menu that can be displayed and from which a user may select an input to disable or enable the input. When in the disable input menu the TV may be indicated as an "RF tuner" as shown. To change the enablement status of an input, the user toggles the enabled status shown. When an input has been disabled, as shown in FIG. 8 it is automatically moved to the end (e.g., bottom) of the list, with the most recently disabled input being laced in the bottom-most position on the list. Thus, cross-referencing FIGS. 7 and 8 and as indicated by the arrows therebetween, the user has disabled, in temporal order, the following video inputs, which consequently appear in the list in the same order: component 1, component 2, HDMI 2, DMP. All of the remaining enabled inputs, in the case shown TV, video 1, video 2, HDMI 1, and PC, appear in the list ahead of (e.g., above) the disabled inputs, which are indicated on the list of FIG. 8 as having been disabled by the annotation "skip". The inverse of the above process can be used to reorder the entries on the list, i.e., when a disabled input is enabled, it may be moved to the top of the list, in some embodiments ahead of even the "TV" entry if desired.

While the particular DYNAMICALLY CONFIGURABLE VIDEO INPUT LIST FOR TV is herein shown and described in detail, it is to be understood that the subject matter which is encompassed by the present invention is limited only by the claims.

What is claimed is:

1. A system comprising:
   a video monitor;
   a TV tuner; and
   one or more computer readable media containing a list of video inputs comprising an entry to enable selection of the TV tuner as a desired source of video to be displayed on the video monitor and instructions executable by a processor, wherein the list of video inputs is presented on the video monitor as a user interface, wherein the user interface enables a user to select a video input from the list of video inputs; and
   the processor accessing instructions to dynamically establish an order of the video inputs on the list of video inputs as displayed on the video monitor based on previous selections of the video inputs from the list of video inputs and a time of day based priority, wherein each of the video inputs of the list of video inputs is associated with a frequency of selection of the video inputs and the time of day based priority of the video inputs, wherein the processor determines a type of selection for each of the video inputs based on time of selection of the video inputs.

2. The system of claim 1, wherein the processor orders the list of video inputs, wherein the video inputs which are frequently selected from the list of video inputs are towards the top of the list of video inputs than the ones which are not.

3. The system of claim 1, wherein the list of video inputs is ordered with recently selected video inputs towards the top of the list of video inputs than the ones which are not.

4. The system of claim 1, wherein a generic video source label of the video input in the list of video inputs is automatically replaced with a specific video source label.

5. The system of claim 1, wherein the list of video inputs is reordered in response to the user selecting an entry on the list of video inputs to be disabled or enabled.

6. The system of claim 1, wherein the list of video inputs has a first entry, wherein a TV tuner input is always the first entry regardless of user selections from the list of video inputs.

7. The system of claim 6, wherein remaining video inputs after the first entry are ordered according to the frequency of selection of the video inputs and the time of day based priority.

8. A method for dynamically establishing an order of video inputs in a video monitor, comprising:
   dynamically establishing an order of the video inputs on a list of video inputs displayed on the video monitor based on previous selections of the video and a time of day based priority, wherein each of the video inputs of the list of video inputs is associated with a frequency of selection of the video inputs and time of day based priority of the video inputs, wherein the processor determines a type of selection for each of the video inputs based on time of selection of the video inputs.

9. The method of claim 8, wherein the video inputs which are frequently selected from the list of video inputs are towards the top of the list of video inputs than the ones which are not.

10. The method of claim 8, wherein the list of video inputs is ordered with recently selected video inputs towards the top of the list of video inputs than the ones which is not.

11. The method of claim 8, wherein a generic video source label of the video input in the list of video inputs is automatically replaced with a specific video source label.

12. The method of claim 8, wherein the list of video inputs is reordered in response to the user selecting an entry on the list of video inputs to be disabled or enabled.

13. The method of claim 8, wherein the list of video inputs has a first entry, wherein a TV tuner input is always the first entry regardless of user selections from the list of video inputs.

14. The method of claim 8, wherein remaining video inputs after the first entry is ordered according to the frequency of selection of the video inputs from the list of video inputs and the time of day based priority.

\* \* \* \* \*